United States Patent
Chen et al.

(10) Patent No.: US 10,621,651 B2
(45) Date of Patent: Apr. 14, 2020

(54) AUTOMATIC RECHARGE SYSTEM AND METHOD, AND SERVER

(71) Applicant: TENCENT TECHNOLOGY (SHENZHEN) COMPANY LIMITED, Shenzhen (CN)

(72) Inventors: Ye Chen, Shenzhen (CN); Yicong Liu, Shenzhen (CN); Xin Li, Shenzhen (CN); Xiaoxia Pan, Shenzhen (CN); Junqiang Wen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/679,882

(22) Filed: Aug. 17, 2017

(65) Prior Publication Data

US 2018/0033075 A1    Feb. 1, 2018

Related U.S. Application Data

(63) Continuation of application No. PCT/CN2016/082234, filed on May 16, 2016.

(30) Foreign Application Priority Data

Jun. 3, 2015 (CN) .......................... 2015 1 0300329

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06Q 10/083* (2013.01); *G06Q 20/123* (2013.01);
(Continued)

(58) Field of Classification Search
CPC .............. G06Q 30/00; G06Q 30/0601; G06Q 30/0613; G06Q 30/0633; G06Q 30/0645
See application file for complete search history.

(56) References Cited

U.S. PATENT DOCUMENTS 8,554,694 B1    10/2013  Ward et al.
2003/0050043 A1   3/2003  Ohrstrom et al.
(Continued)

FOREIGN PATENT DOCUMENTS

CN    102263867 A    11/2011
CN    103747157 A    4/2014
(Continued)

OTHER PUBLICATIONS

Shang, Pengju, Saba Serish, and Jun Wang. "Traid: Exploiting temporal redundancy and spatial redundancy to boost transaction processing systems performance." IEEE Transactions on Computers 61.4 (2011): 517-529. (Year: 2011).*
(Continued)

*Primary Examiner* — Christopher B Seibert
(74) *Attorney, Agent, or Firm* — Anova Law Group, PLLC

(57) ABSTRACT

The present disclosure discloses an automatic recharge system and method, and a server, and belongs to a field of online recharge. The system includes: an agent server end on which an automatic recharge program runs, a third-party platform server, and at least one provider server, each provider server providing at least one online recharge service; the third-party platform server generates at least one order and stores the order; the agent server end logs in the third-party platform server by using the automatic recharge program and obtains the order; and the agent server end sends a recharge parameter corresponding to the order to the provider server by using the automatic recharge program, so (Continued)

as to complete an online recharge process corresponding to the order.

20 Claims, 12 Drawing Sheets

(51) Int. Cl.
*H04M 17/00* (2006.01)
*H04L 12/14* (2006.01)
*H04M 15/00* (2006.01)
*H04M 17/02* (2006.01)
*G06Q 20/28* (2012.01)
*G06Q 20/36* (2012.01)
*G06Q 10/08* (2012.01)
*G06Q 20/12* (2012.01)
*H04L 29/08* (2006.01)

(52) U.S. Cl.
CPC ......... *G06Q 20/28* (2013.01); *G06Q 20/3672* (2013.01); *H04L 12/14* (2013.01); *H04L 12/1467* (2013.01); *H04L 67/20* (2013.01); *H04M 15/49* (2013.01); *H04M 15/51* (2013.01); *H04M 15/52* (2013.01); *H04M 15/64* (2013.01); *H04M 17/00* (2013.01); *H04M 17/02* (2013.01); *H04M 17/204* (2013.01)

(56) References Cited

U.S. PATENT DOCUMENTS

| | | | |
|---|---|---|---|
| 2003/0158790 A1 | 8/2003 | Kargman | |
| 2011/0015976 A1* | 1/2011 | Lempel | G06Q 30/02 705/14.12 |
| 2011/0162086 A1* | 6/2011 | Rogel | G06F 21/10 726/28 |
| 2014/0189808 A1* | 7/2014 | Mahaffey | H04L 63/083 726/4 |
| 2016/0055481 A1* | 2/2016 | Ellis | G06Q 20/36 705/41 |

FOREIGN PATENT DOCUMENTS

| | | | |
|---|---|---|---|
| CN | 103854191 A | 6/2014 |
| CN | 104077691 A | 10/2014 |
| CN | 104283931 A | 1/2015 |
| JP | 2003152904 A | 5/2003 |
| JP | 2007537506 A | 12/2007 |
| JP | 2009048308 A | 3/2009 |
| JP | 2010198568 A | 9/2010 |
| JP | 2014199534 A | 10/2014 |
| KR | 20100009096 A | 1/2010 |
| WO | 0241620 A2 | 5/2002 |

OTHER PUBLICATIONS

The World Intellectual Property Organization (WIPO) International Search Report for PCT/CN2016/082234 Jul. 27, 2016 pp. 1-2.
The Japan Patent Office (JPO) Notification of Reasons for Refusal for Application No. 2017-562718 and Translation Jan. 11, 2019 5 Pages.
The European Patent Office (EPO) The Extended European Search Report for 16802448.5 Apr. 25 , 2018 10 Pages.
Korean Intellectual Property Office (KIPO) Office Action 1 for 20177037070 Jun. 21, 2019 12 Pages (including translation).

* cited by examiner $EC,$BD,$6B,$B7,$3D,$49,$52,$DE,$17,$91,$99,$55,$E7,$7F,$04,$66,$E4,$17,$33,$48,$6F,$66,$1A,$7F
$82,$9E,$6E,$A6,$A7,$E7,$E3,$F4,$CC,$30,$6F,$2C,$63,$AD,$E5,$E5,$85,$25,$24,$78,$6D,$23,$21,$5F
$B8,$0C,$37,$03,$92,$BD,$40,$02,$24,$C4,$20,$10,$37,$49,$D8,$FE,$60,$DE,$99,$59,$97,$CC,$CB,$5B
$64,$9D,$BD,$CF,$F9,$F7,$F4,$F3,$13,$D3,$A7,$76,$55,$3C,$95,$55,$7B,$B7,$56,$3D,$1D,$15,$19,$C9
$1F,$12,$FD,$6B,$22,$FA,$D1,$DB,$FF,$BE,$46,$3B,$7C,$FB,$BF,$04,$1A,$C3,$05,$77,$56,$94,$21,$5D
$51,$EB,$94,$6D,$51,$57,$50,$95,$B4,$0E,$28,$2E,$4C,$1D,$7E,$49,$71,$FB,$FD,$AA,$DF,$EE,$E8,$37
$C9,$C3,$67,$7F,$76,$45,$39,$00,$00,$00,$00,$DE,$12,$6B,$8D,$35,$26,$3E,$B4,$99,$8D,$31,$74,$FB
$9F,$D9,$9F,$E1,$86,$76,$D0,$96,$43,$3E,$D2,$5A,$B6,$CE,$07,$F3,$ED,$7F,$C6,$3A,$EB,$25,$B7,$3D
$C9,$13,$DF,$9A,$75,$49,$CE,$CE,$C6,$39,$E3,$D2,$3D,$81,$27,$F1,$D9,$AC,$4F,$63,$D7,$E0,$CC,$71
$D6,$AF,$13,$FD,$4F,$B7,$BF,$CF,$B7,$FF,$7D,$F5,$1C,$AB,$61,$C1,$DA,$67,$9C,$54,$74,$6C,$5E,$3B
$BC,$C5,$5B,$29,$3A,$BC,$9F,$0A,$00,$00,$00,$00,$FC,$D0,$12,$D3,$52,$B7,$7F,$9A,$F8,$A7,$B6,$67
$C3,$DE,$AC,$68,$2E,$2E,$F7,$90,$5D,$E3,$CF,$CE,$C8,$3D,$65,$CC,$CD,$CB,$CA,$98,$75,$7D,$96,$BB
$8A,$98,$0A,$7C,$7A,$D5,$0F,$89,$FE,$E0,$F6,$F7,$BF,$A2,$34,$AF,$4A,$3F,$24,$79,$55,$B9,$B3,$9D
$6F,$AD,$2B,$B8,$3B,$4C,$EB,$48,$EF,$C2,$2A,$E3,$8F,$6E,$BE,$A5,$EB,$7E,$5F,$97,$EC,$F6,$BC,$39
$9F,$57,$EC,$C2,$20,$9E,$92,$00,$00,$00,$00,$E0,$85,$9C,$79,$55,$FF,$E8,$AE,$E7,$55,$BD,$B7,$65
$9F,$57,$35,$C3,$BC,$EA,$CD,$BD,$66,$79,$55,$76,$56,$95,$57,$7D,$37,$BE,$D2,$24,$AF,$FA,$31,$D1
$AF,$53,$C5,$AB,$4A,$06,$66,$AA,$BA,$B7,$13,$3F,$E7,$F1,$5A,$76,$A8,$EB,$3C,$F3,$CF,$C3,$0B,$4B
$77,$8B,$93,$2A,$C6,$28,$DD,$A4,$62,$0C,$9D,$22,$1E,$11,$96,$70,$EC,$A0,$A5,$89,$EC,$1A,$CA,$34
$36,$F7,$9F,$CA,$5C,$BA,$CE,$AE,$CE,$2B,$00,$00,$00,$00,$A0,$85,$8B,$87,$F6,$91,$57,$E5,$ED,$FF
$65,$CE,$34,$23,$98,$56,$7B,$7B,$30,$9B,$30,$1C,$70,$73,$A6,$1C,$F6,$CA,$30,$77,$66,$5F,$6F,$B1
$8B,$B9,$59,$D3,$2C,$C8,$DD,$62,$16,$97,$EE,$B1,$EE,$29,$77,$AF,$F6,$C9,$2C,$85,$9F,$95,$38,$B7
$EE,$E7,$F5,$79,$D5,$3F,$24,$59,$AF,$4A,$45,$C6,$6C,$A6,$D4,$51,$E1,$42,$78,$52,$C1,$15,$6B,$B3
$ED,$A9,$CB,$5A,$67,$1C,$7B,$BC,$47,$2A,$AA,$07,$47,$AE,$B0,$AD,$18,$48,$26,$7E,$8F,$8A,$4C,$55
$B0,$3A,$39,$00,$00,$00,$00,$00,$DE,$12,$75,$ED,$2A,$EB,$F2,$AA,$BE,$5E,$35,$CD,$43,$F9,$BC,$AA
$7C,$C1,$6F,$56,$E1,$11,$AC,$A2,$5E,$95,$93,$BC,$EA,$27,$44,$7F,$46,$ED,$BC,$AA,$D6,$81,$CC,$7A

FIG. 6

AUTOMATIC RECHARGE SYSTEM AND METHOD, AND SERVER

RELATED APPLICATION

This application is a continuation application of PCT Patent Application No. PCT/CN2016/082234, filed on May 16, 2016, which claims priority to Chinese Patent Application No. 201510300329.4, entitled "AUTOMATIC RECHARGE SYSTEM AND METHOD, AND APPARATUS" filed on Jun. 3, 2015, the entire contents of both of which are incorporated herein by reference.

FIELD OF THE TECHNOLOGY

The present disclosure relates to the field of online recharge, and in particular, to an automatic recharge system and method, and a server.

BACKGROUND OF THE DISCLOSURE

An online recharge system is configured to recharge a virtual resource. The virtual resource includes a virtual currency and/or a virtual prop. The virtual currency may be various virtual coins, coupons, bonus points, and call fees that are provided on a network transaction platform. The virtual prop may be a game prop, a live interaction prop, and a learning prop. Different providers may issue different types of virtual resources.

In the existing technology, each region is correspondingly provided with an agent providing an online recharge service, and an agent server end used by the agent is connected to a server of at least one provider. A user in a region may use a user terminal to establish an order in an agent server end of the region. Then the agent uses, according to the order, the agent server end to interact with a server of a corresponding provider, so as to complete recharge of the virtual resource.

During a process of implementing the present disclosure, an inventor finds that the technology has at least the following problems:

Each provider provides multiple online recharge modes such as website online recharge, ESALES (E-card online sales system) interface recharge, entity card password recharge, and electronic card password recharge. Therefore, the agent needs to learn and master multiple online recharge modes, and the agent needs to manually operate the agent server end so as to interact with a corresponding provider server and complete all or a part of an online recharge process of the order, thus leading to relatively low recharging efficiency and a relatively high error rate.

SUMMARY

Embodiments of the present disclosure provide an automatic recharge system and method, and a server. The technical solution is as follows.

According to a first aspect, an automatic recharge system is provided, the system including: an agent server end configured to run an automatic recharge program, a third-party platform server, and at least one provider server, each provider server providing at least one online recharge service; the third-party platform server being configured to generate at least one order according to an online recharge request sent by a user terminal, and store the order; the agent server end being configured to log in the third-party platform server by using the automatic recharge program, and obtain the order from the third-party platform server by using the automatic recharge program; the agent server end being configured to: for an order at an incomplete state, send a recharge parameter corresponding to the order to a provider server associated with the recharge parameter by using the automatic recharge program; and the provider server being configured to complete an online recharge process corresponding to the order according to the recharge parameter.

According to a second aspect, an automatic recharge method is provided, applied to an agent server end, the method including: logging in a third-party platform server by using an automatic recharge program on the agent server; obtaining an order from the third-party platform server by using the automatic recharge program, the order being generated by the third-party platform server according to an online recharge request sent by a user terminal; and for an order at an incomplete state, sending a recharge parameter corresponding to the order to a provider server by using the automatic recharge program, so that the provider server completes an online recharge process corresponding to the order according to the recharge parameter.

According to a third aspect, an automatic recharge method is provided, applied to a third-party platform server, the method including: generating at least one order according to an online recharge request sent by a user terminal, and storing the order; and after an agent server end logs in the third-party platform server, providing the order to the agent server end, so that the agent server end sends a recharge parameter corresponding to the order to a provider server by using an automatic recharge program, and the provider server completes an online recharge process corresponding to the order according to the recharge parameter, the automatic recharge program running on the agent server end.

According to a fourth aspect, a server is provided, and the server including: a login module, configured to log in a third-party platform server by using an automatic recharge program executed on the server; an obtaining module, configured to obtain an order from the third-party platform server by using the automatic recharge program, the order being generated by the third-party platform server according to an online recharge request sent by a user terminal; and a processing module, configured to: for an order at an incomplete state, send a recharge parameter corresponding to the order to a provider server by using the automatic recharge program, so that the provider server completes an online recharge process corresponding to the order according to the recharge parameter.

According to a fifth aspect, a server is provided, the server including: an order generation module, configured to generate at least one order according to an online recharge request sent by a user terminal, and store the order; an agent login module, configured to determine whether an agent server end logs in a third-party platform server, an automatic recharge program running on the agent server end; and an order providing module, configured to: after an agent server end logs in the third-party platform server, provide the order to the agent server end, so that the agent server end sends a recharge parameter corresponding to the order to a provider server by using the automatic recharge program, and the provider server completes an online recharge process corresponding to the order according to the recharge parameter.

According to a sixth aspect, a server is provided, the server including: a central processing unit and a memory, the memory storing a group of program codes, and the central processing unit executing the program codes stored in the memory to complete the following operations: logging in a third-party platform server by using an automatic recharge program; obtaining an order from the third-party platform server by using the automatic recharge program, the order being generated by the third-party platform server according to an online recharge request sent by a user terminal; and for an order at an incomplete state, sending a recharge parameter corresponding to the order to a provider server by using the automatic recharge program, so that the provider server completes an online recharge process corresponding to the order according to the recharge parameter.

According to a seventh aspect, a server is provided, the server including: a central processing unit and a memory, the memory storing a group of program codes, and the central processing unit executing the program codes stored in the memory to complete the following operations: generating at least one order according to an online recharge request sent by a user terminal, and storing the order; and after an agent server end logs in a third-party platform server, providing the order to the agent server end, so that the agent server end sends a recharge parameter corresponding to the order to a provider server by using an automatic recharge program, and the provider server completes an online recharge process corresponding to the order according to the recharge parameter, the automatic recharge program running on the agent server end.

By implementing the technical solution provided by the embodiments of the present disclosure: an order is uniformly managed by using a third-party platform server, and an automatic recharge program running in an agent server end automatically interacts with a provider server, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6 is a sample schematic diagram of a verification code sample library according to another embodiment of the present disclosure;

DESCRIPTION OF EMBODIMENTS

To make the objectives, technical solutions, and advantages of the present disclosure clearer, the following further describes the embodiments of the present invention in detail with reference to the accompanying drawings.

Figure 1:
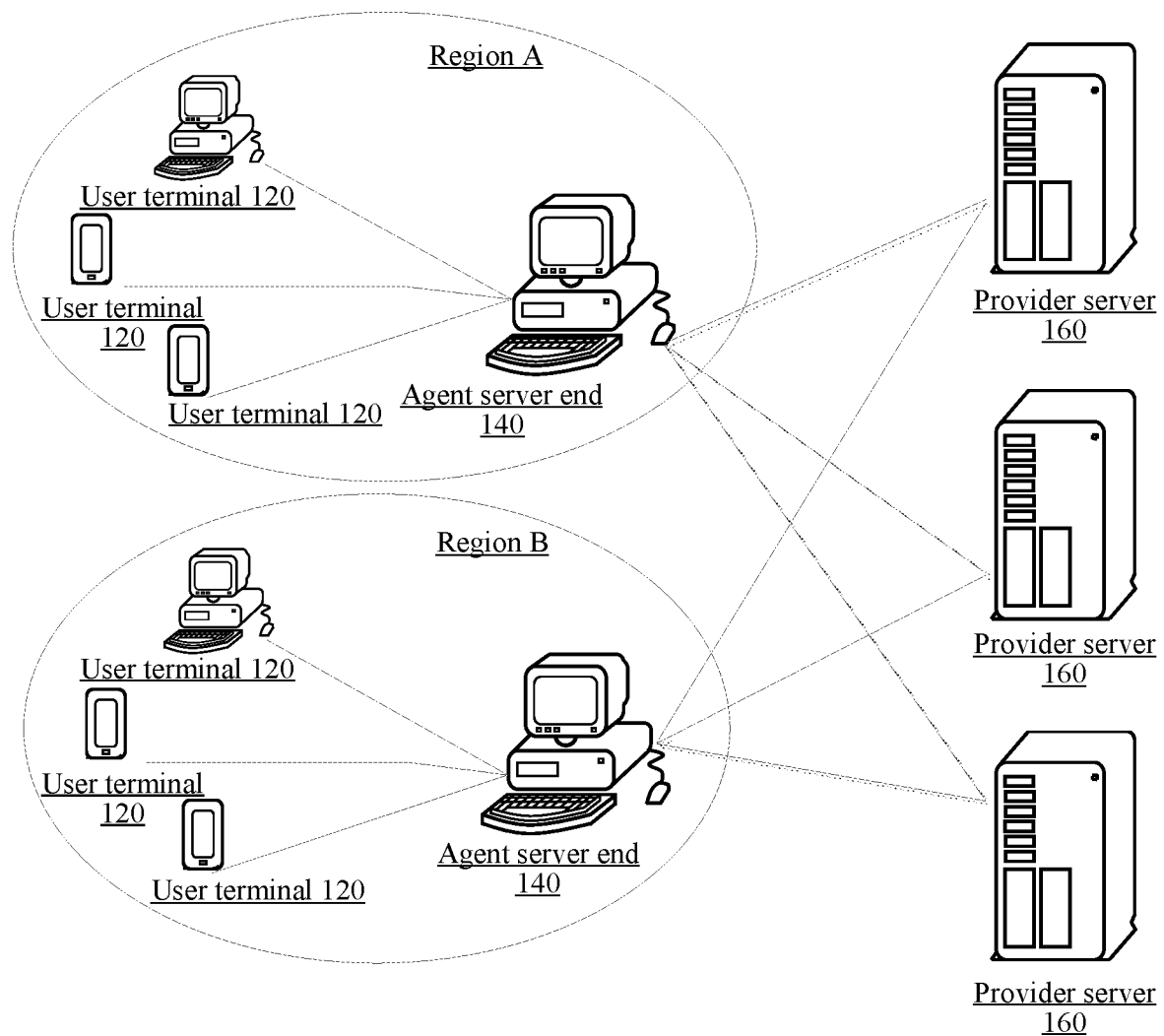
FIG. 1 is a schematic structural diagram of an automatic recharge system in the existing technology.

Referring to FIG. 1, FIG. 1 is a schematic structural diagram of an automatic recharge system in the existing technology. The system includes at least one user terminal 120, at least one agent server end 140, and at least one provider server 160.

The user terminal 120 is a terminal used by an ordinary user, such as a mobile phone, a tablet, or a desktop computer. The ordinary user may establish a connection with the agent server end 140 of this region by using the user terminal 120, and then send an online recharge request to the agent server end 140.

The agent server end 140 is a computer device used by an agent, and each region may correspond to different agents. For example, region A corresponds to agent A, and region B corresponds to agent B. The agent server end 140 may be a desktop computer, a notebook computer, a smart phone, or a tablet. After receiving the online recharge request of this region, the agent server end 140 interacts with the corresponding provider server 160, so as to complete an online recharge process corresponding to the online recharge request.

The provider server 160 is a server set up by a provider of a virtual resource. The virtual resource includes a virtual currency and/or a virtual prop. The virtual currency may be various virtual coins, coupons, bonus points, and call fees that are provided on a network transaction platform. The virtual prop may be a game prop, a live interaction prop, and a learning prop. Each provider server 160 may provide an online recharge service of at least one type of the virtual resource. For example, a provider server A provides an online recharge service of the virtual coins, and a provider server B provides an online recharge service of the call fees.

The virtual resource provided by the provider server 160 may be stopped issuing or updating, and there are multiple online recharge modes corresponding to each virtual resource, such as website online recharge, ESALES interface recharge, entity card password recharge, and electronic card password recharge. Therefore, the agent needs to learn and master multiple online recharge modes, and the agent needs to manually operate the agent server end 140, so as to interact with the corresponding provider server 160 and complete all or a part of the online recharge process corresponding to the online recharge request.

Figure 2:
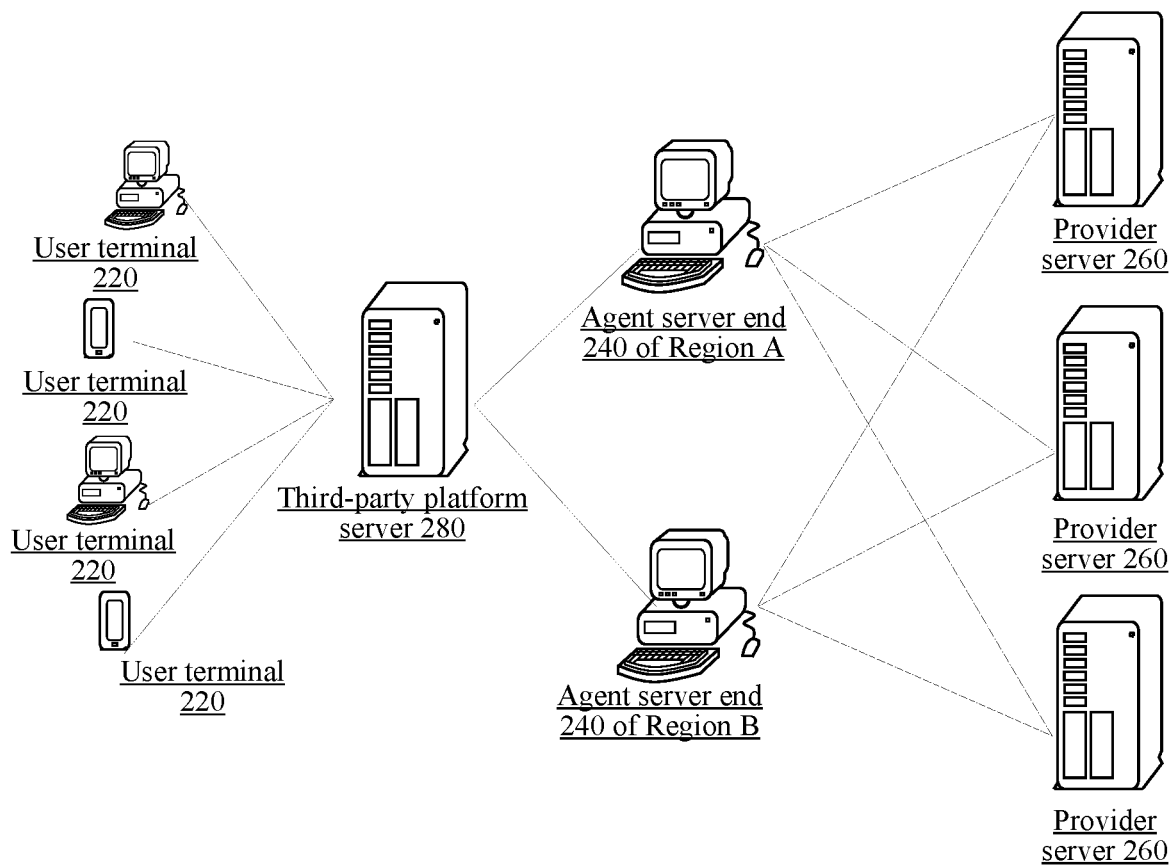
FIG. 2 is a schematic structural diagram of an automatic recharge system according to an embodiment of the present disclosure.

Referring to FIG. 2, FIG. 2 is a schematic structural diagram of an automatic recharge system according to an embodiment of the present disclosure. The system includes a user terminal 220, an agent server end 240 on which an automatic recharge program runs, a third-party platform server 280, and at least one provider server 260, each provider server 260 providing at least one online recharge service.

Different from FIG. 1, the automatic recharge program runs on the agent server end 240, and the automatic recharge program is an application program provided by a software service provider and configured to automatically complete online recharge.

The third-party platform server 280 is a server set up by the software service provider. The third-party platform server 280 is configured to receive an online recharge request sent by the user terminal 220 and generate an order, and then provide the order for the agent server end 240. The agent server end 240 automatically interacts with the provider server 260 to complete an online recharge process of the order.

Figure 3:
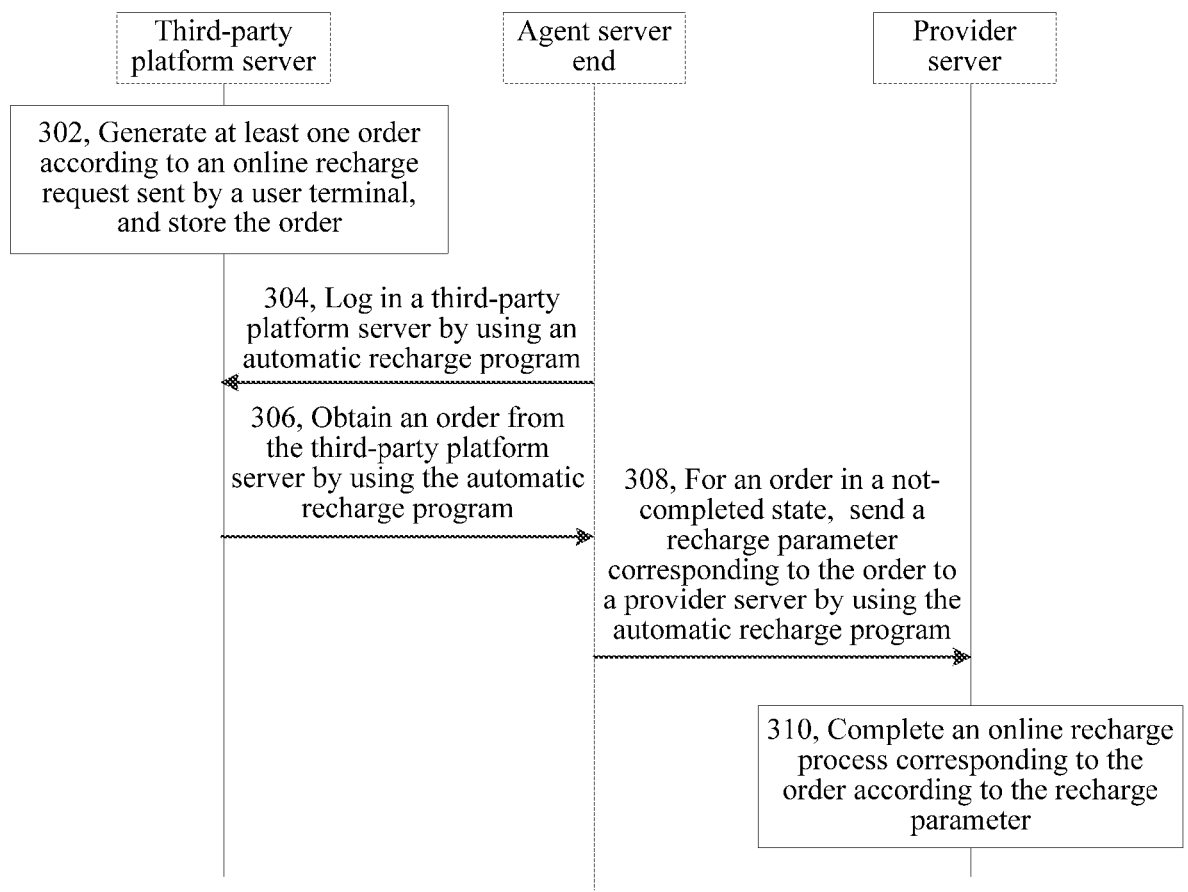
FIG. 3 is a method flowchart of an automatic recharge method according to an embodiment of the present disclosure.

Referring to FIG. 3, FIG. 3 is a method flowchart of an automatic recharge method according to an embodiment of the present disclosure. This embodiment is described by using an example in which the automatic recharge method is applied to the automatic recharge system shown in FIG. 2. The method includes:

Step 302: A third-party platform server generates at least one order according to an online recharge request sent by a user terminal, and stores the order.

Step 304: An agent server end logs in the third-party platform server by using an automatic recharge program.

Step 306: An agent server end obtains an order from the third-party platform server by using the automatic recharge program.

Step 308: For an order at an incomplete state, the agent server end sends a recharge parameter corresponding to the order to a provider server (e.g., associated with the recharge parameter) by using the automatic recharge program.

Step 310: The provider server completes an online recharge process corresponding to the order according to the recharge parameter.

In conclusion, in an automatic recharge method provided in this embodiment, an order is uniformly managed by using a third-party platform server, and an automatic recharge program running in an agent server end automatically interacts with a provider server, so as to complete an online recharge process corresponding to the order, thereby overcoming a defect that an agent needs to learn and master multiple online recharge manners (i.e., recharge modes), resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

Figure 4:
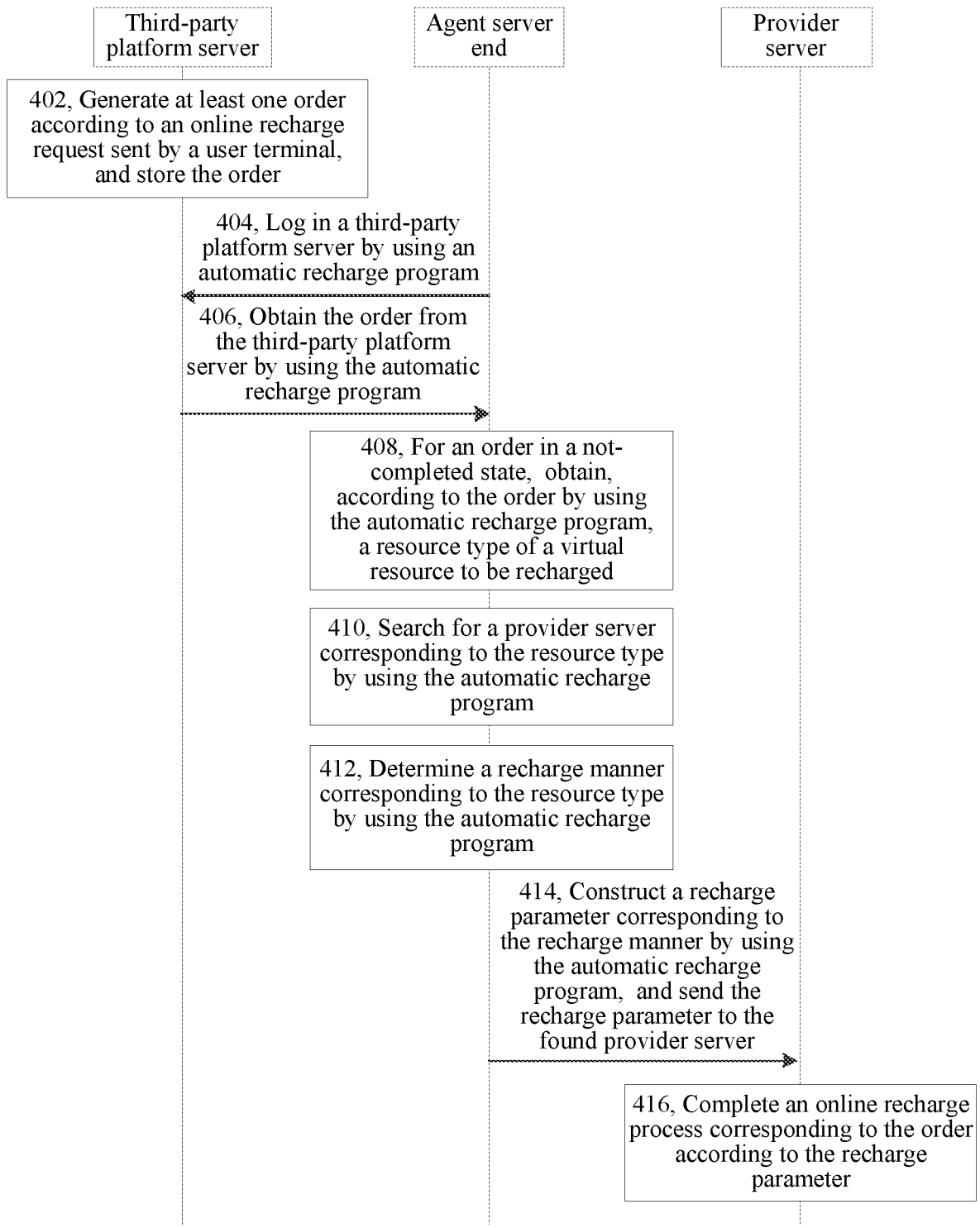
FIG. 4 is a method flowchart of an automatic recharge method according to another embodiment of the present disclosure.

Referring to FIG. 4, FIG. 4 is a method flowchart of an automatic recharge method according to another embodiment of the present disclosure. This embodiment is described by using an example in which the automatic recharge method is applied to the automatic recharge system shown in FIG. 2. The method includes:

Step 402: A third-party platform server generates at least one order according to an online recharge request sent by a user terminal, and stores the order.

When a user needs to perform online recharge on a particular virtual resource, the user generally sends the online recharge request to the third-party platform server by using the user terminal.

The online recharge request carries a user account number to be recharged, a virtual resource type, and a recharge quantity. Optionally, the online recharge request may also carry an identifier of a region to which the online recharge request belongs, or an identifier of a selected agent. This embodiment of the present disclosure does not specifically define content carried by the online recharge request.

An exemplary order list is shown in Table 1. Time in the Table 1 indicates a generation time of an order, and the third-party platform server allocates an order number to each order when generating the order. For an order, the status of the order may be divided into two states, that is, an incomplete state and a completed state. The incomplete order indicates an order of which an online recharge process is not completed, and a completed order indicates an order of which an online recharge process is completed.

TABLE 1

| Order Number | Virtual Resource Type | Recharge Quantity | User Account Number To Be Recharged | Region Identifier Or Agent Identifier | Time | State |
|---|---|---|---|---|---|---|
| 00001 | Learning gold coin | 10 | 123456XX@163.com | 764656 | 2015 May 14 17:32:17 | Not completed |
| 00002 | Mobile phone call fee | 100 | 186XXXX2631 | Beijing | 2015 May 13 20:30:11 | Not completed |
| 00003 | Game coupon | 500 | XIAOYAOXIAOZI | 4678358 | 2015 May 12 01:42:10 | Completed |

Step 404: An agent server end logs in the third-party platform server by using an automatic recharge program.

In this embodiment of the present disclosure, two or more than two automatic recharge programs run on an agent server end. In addition, based on security consideration, before the agent server end pulls, by using the automatic recharge program, an order stored in the third-party platform server, the third-party platform server needs to perform login authentication on the agent server end.

When login authentication is performed, an agent needs to input an agent identifier, a password, and additional information in a login page displayed by the automatic recharge program for logging in the third-party platform server. The additional information may include an URL (Uniform Resource Locator) address, a hardware address, or a platform ID of the third-party platform server. This embodiment of the present disclosure does not specifically define content included in the additional information. After receiving the agent identifier, the password, and the additional information that are sent by the agent server end, the third-party platform server authenticates the foregoing information, and sets the agent server end to be in a login state after the authentication passes, so as to complete a process of logging in the third-party platform server by the agent server end.

Optionally, considering that data transmission between the agent server end and the third-party platform server is cross-region and is performed on a public network, in order to ensure security of the data transmission between the agent server end and the third-party platform server, an encrypted data transmission manner is adopted for data transmission between the automatic recharge program and the third-party platform server. That is, when performing a session each time, the agent server end and the third-party platform server use a random key to encrypt data to be transmitted. For example, a 3DES (Triple Data Encryption Algorithm) manner is adopted to encrypt the data to be transmitted. This embodiment of the present disclosure does not specifically define the adopted encryption manner. The agent server end such as the agent identifier, the password, and the random key may be pulled from a local database by using the automatic recharge program. This embodiment of the present disclosure does not specifically define this, either.

Step 406: The agent server end obtains the order from the third-party platform server by using the automatic recharge program.

There is a large quantity of users with potential online recharge demands, and time for the online recharge demands of different users is different. Therefore, orders on the third-party platform are continuously generated, and the agent server end needs to continuously obtain orders from the third-party platform. Generally, the agent server end adopts the following three manners to obtain orders from the third-party platform, and details are as follows:

A first manner: the agent server end obtains the order from the third-party platform server in real time by using the automatic recharge program.

For the first manner, the automatic recharge program is in a work state, and monitors in real time whether the third-party platform server generates a new order. If the third-party platform server generates the new order, the automatic recharge program instantly obtains the order.

A second manner: the agent server end obtains the order from the third-party platform server every other a predetermined time interval by using the automatic recharge program.

For the second manner, the automatic recharge program periodically obtains orders from the third-party platform server. The predetermined time interval may be five seconds, two minutes, or another time length. This embodiment of the present disclosure does not specifically define a magnitude of the predetermined time interval. The automatic recharge program obtains an order from the third-party platform server every other a predetermined time interval. Using an example in which the predetermined time interval is two minutes, if the third-party platform server generates a new order in two minutes after the third-party platform server obtains the order last time and before the third-party platform server obtains the order this time, the automatic recharge program obtains, at one time, all orders generated in this time period.

Certainly, in addition to the manner of obtaining an order from the third-party platform server by the agent server end by using the automatic recharge program, this embodiment of the present disclosure further supports a manner of actively pushing an order to the agent server end by the third-party platform server, and details are shown in the following third manner.

A third manner: when there is an incomplete order, the third-party platform server actively pushes the incomplete order to the agent server end.

For the third manner, when querying that there is an incomplete order, the third-party platform server actively pushes the incomplete order to the agent server end. It should be noted that the incomplete order here refers to an order that is newly generated by the third-party platform server and that has not been sent to the agent server end before.

It should be noted that because there are multiple agent server ends, when actively pushing the order, the third-party platform server only sends the order corresponding to the current agent server end to the agent server end.

The order corresponding to the current agent server end meets the following condition: a region identifier in the order is a region identifier corresponding to the current agent server end; or an agent identifier in the order is an identifier corresponding to the current agent server end.

Step 408: For an order at an incomplete state, the agent server end obtains, according to the order by using the automatic recharge program, a resource type of a virtual resource to be recharged.

Because different resource types of virtual resources correspond to respective provider servers, and generally, one provider server can only perform online recharge on a virtual resource corresponding to the provider server, for an order at an incomplete state, the agent server end needs to first obtain the resource type of the virtual resource to be recharged. For example, for an order 00001 in Table 1, it is determined by querying Table 1 that the resource type of the virtual resource to be recharged is the "learning gold coin".

Step 410: The agent server end searches for a provider server corresponding to the resource type by using the automatic recharge program.

The agent server end may set a correspondence between the resource type and the provider server in advance. In this way, after the resource type of the virtual resource to be recharged is obtained, the provider server corresponding to the resource type may be obtained by searching for the correspondence. In addition, the agent server end may update the correspondence at regular times, so as to prevent a correspondence between a particular resource type and a particular provider server from changing. This embodiment of the present disclosure does not specifically define an implementation manner of searching for the provider server.

For example, the agent server end searches for provider server A corresponding to the "learning gold coin" by using the automatic recharge program.

Step 412: The agent server end determines a recharge mode corresponding to the resource type by using the automatic recharge program.

The recharge mode includes: a recharge mode of simulating user login by using an account number and a password, a first interface recharge mode, and a second interface recharge mode. The first interface recharge mode refers to an ESALES recharge mode, and the second interface recharge mode refers to a non-ESALES recharge mode. The ESALES recharge mode refers to a manner of implementing recharge by using an online direct-recharge interface that is provided by the provider server and that is dedicated for a virtual currency or a virtual prop. A non-ESALES recharge mode refers to a manner of implementing online recharge by using another platform interface other than the ESALES recharge mode.

In this embodiment of the present disclosure, because a provider server may provide multiple recharge modes for being selected by the agent server end, after determining the provider server corresponding to the resource type, the agent server end further needs to determine a recharge mode corresponding to the resource type by using the automatic recharge program.

Optionally, this embodiment of the present disclosure sets a priority for each recharge mode. In the recharge modes provided by the found provider server, the agent server end determines a recharge mode corresponding to the resource type according to an order of priorities.

Optionally, a priority of the ESALES recharge mode>a priority of the non-ESALES recharge mode>a priority of the recharge mode of simulating user login by using an account number and a password.

Step 414: The agent server end constructs/generates a recharge parameter corresponding to the recharge mode by using the automatic recharge program, and sends the recharge parameter to the found provider server.

After the recharge mode is determined, the agent server end constructs a recharge parameter corresponding to the recharge mode by using the automatic recharge program, and sends the recharge parameter to the found provider server. If online recharge is performed by using the first interface recharge mode and the second interface recharge mode, the recharge parameter is sent to the found provider server by invoking a corresponding recharge interface. If the recharge mode of simulating user login by using an account number and a password is selected, after logging in the provider server by using the automatic recharge program, the agent server end delivers the recharge parameter to the provider server by filling the recharge parameter on a recharge page provided by the provider server.

The recharge parameter includes but is not limited to: a user account number to be recharged, a virtual resource type, a recharge quantity, and an identifier of a selected agent. This embodiment of the present disclosure does not specifically define content included in the recharge parameter.

It should be noted that different recharge modes correspond to different construction methods of the recharge parameter. Various construction methods of the recharge parameter are built in the automatic recharge program. When the recharge mode is changed, the automatic recharge program may support a new recharge mode by upgrading a version.

Step 416: The provider server completes an online recharge process corresponding to the order according to the recharge parameter.

In conclusion, in an automatic recharge method provided in this embodiment, an order is uniformly managed by using a third-party platform server, and an automatic recharge program running in an agent server end automatically interacts with a provider server, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

Figure 5:
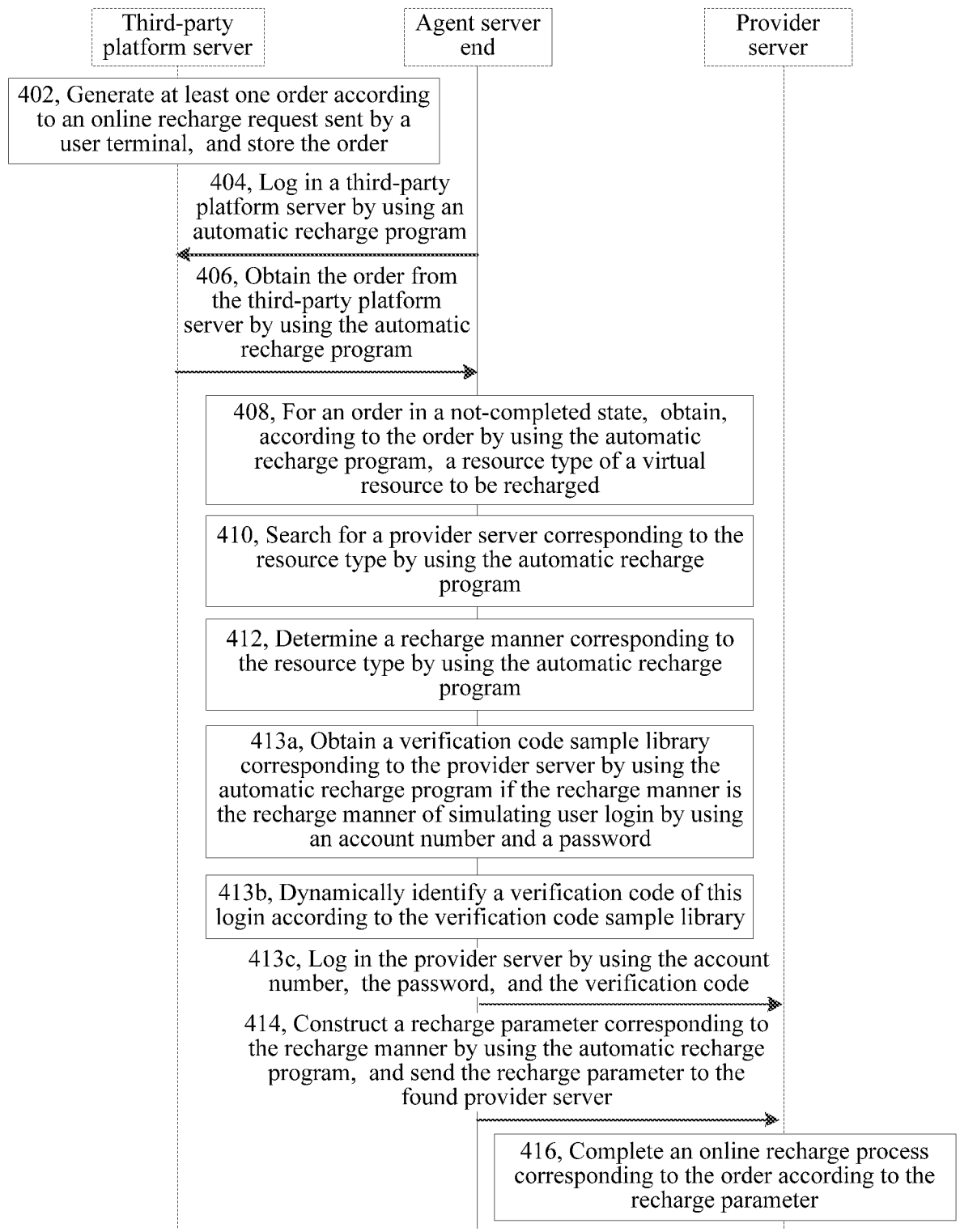
FIG. 5 is a method flowchart of an automatic recharge method according to another embodiment of the present disclosure.

In a possible embodiment, if the recharge mode of simulating user login by using an account number and a password is used, because generally, a dynamic verification code needs to be used to perform identity verification during a login process, before step 414, the following steps are included, and a detailed process is shown in FIG. 5:

Step 413a: The agent server end obtains a verification code sample library corresponding to the provider server by using the automatic recharge program if the recharge mode of simulating user login by using an account number and a password is used.

The verification code sample library may be obtained by the provider server by pre-training. FIG. 6 exemplarily shows a verification code sample library of a provider server. A sample in the verification code sample library is obtained by performing processing such as denoising, division, and gradation on the verification code, and an obtained verification code is stocked, so as to facilitate the automatic recharge program to perform a matching process of the verification code when simulating user login in a subsequent process.

Step 413b: The agent server end dynamically identifies a verification code of this login (e.g., a current login) according to the verification code sample library.

The agent server end downloads, from the provider server, a verification code image used for this login, and performs processing such as on analysis and sampling on the verification code image of this login to obtain a feature code, and then matches the feature code with a feature code in the verification code sample library, so as to match the verification code of this login.

Step 413c: The agent server end logs in the provider server by using the account number, the password, and the verification code.

The agent server end automatically logs in the provider server by using the account number, the password, and the verification code of this login.

In conclusion, this embodiment can implement automatic user login simulation by dynamically identifying a verification code of this login by using a verification code sample library corresponding to each provider server, thereby avoiding problems of complex operations and low efficiency that are caused by user manual login, and achieving an effect that the automatic recharge program may implement unattended operation and automatic running.

Figure 7:
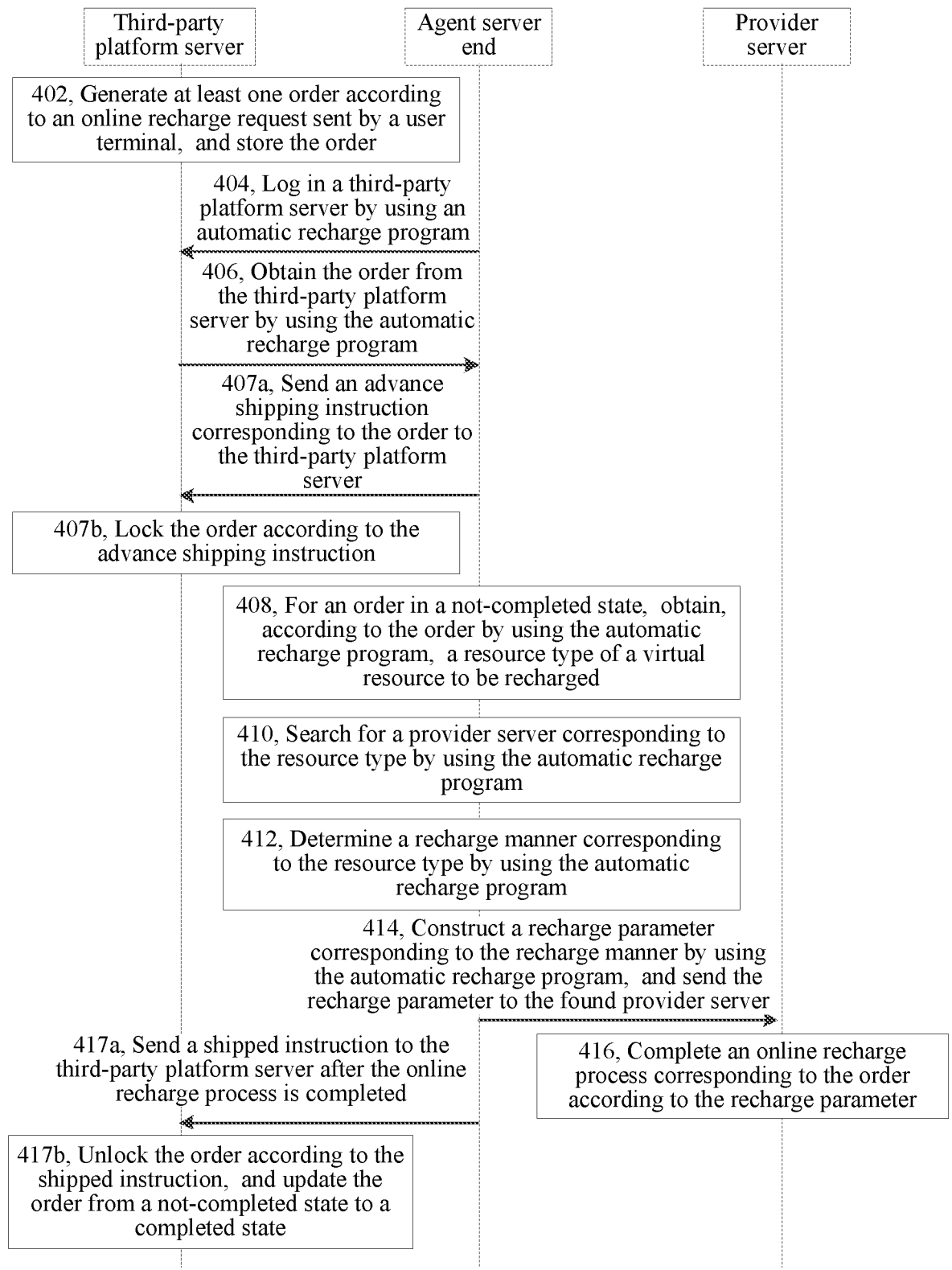
FIG. 7 is a method flowchart of an automatic recharge method according to another embodiment of the present disclosure.

In another possible embodiment, a conflict phenomenon that multiple automatic recharge programs synchronously process a same order may appear. Therefore, in order to avoid this case, step 408 in the foregoing embodiment may further include step 407a and step 407b, and step 417a and step 417b are further included after step 416. Implementation of the foregoing extended steps may ensure that one order is processed only by one automatic recharge program, and a detailed process is shown in FIG. 7:

Step 407a: The agent server end sends an advance shipping instruction corresponding to the order to the third-party platform server.

Correspondingly, the third-party platform server receives the advance shipping instruction.

Step 407b: The third-party platform server locks the order according to the advance shipping instruction.

Step 417a: The agent server end sends a shipped instruction to the third-party platform server after the online recharge process corresponding to the order is completed.

When online recharge succeeds, the provider server feeds a success recharge response back to the agent server end. Correspondingly, in order to enable the third-party platform server to know a processing case of each order in time, the agent server end further updates the status of each order and sends the shipped instruction to the third-party platform server.

Step 417b: The third-party platform server unlocks the order according to the shipped instruction, and updates the order from an incomplete state to a completed state.

In conclusion, by locking the order, this embodiment prevents a case in which multiple automatic recharge programs synchronously process a same order and a conflict occurs, and achieves higher availability.

Figure 8:
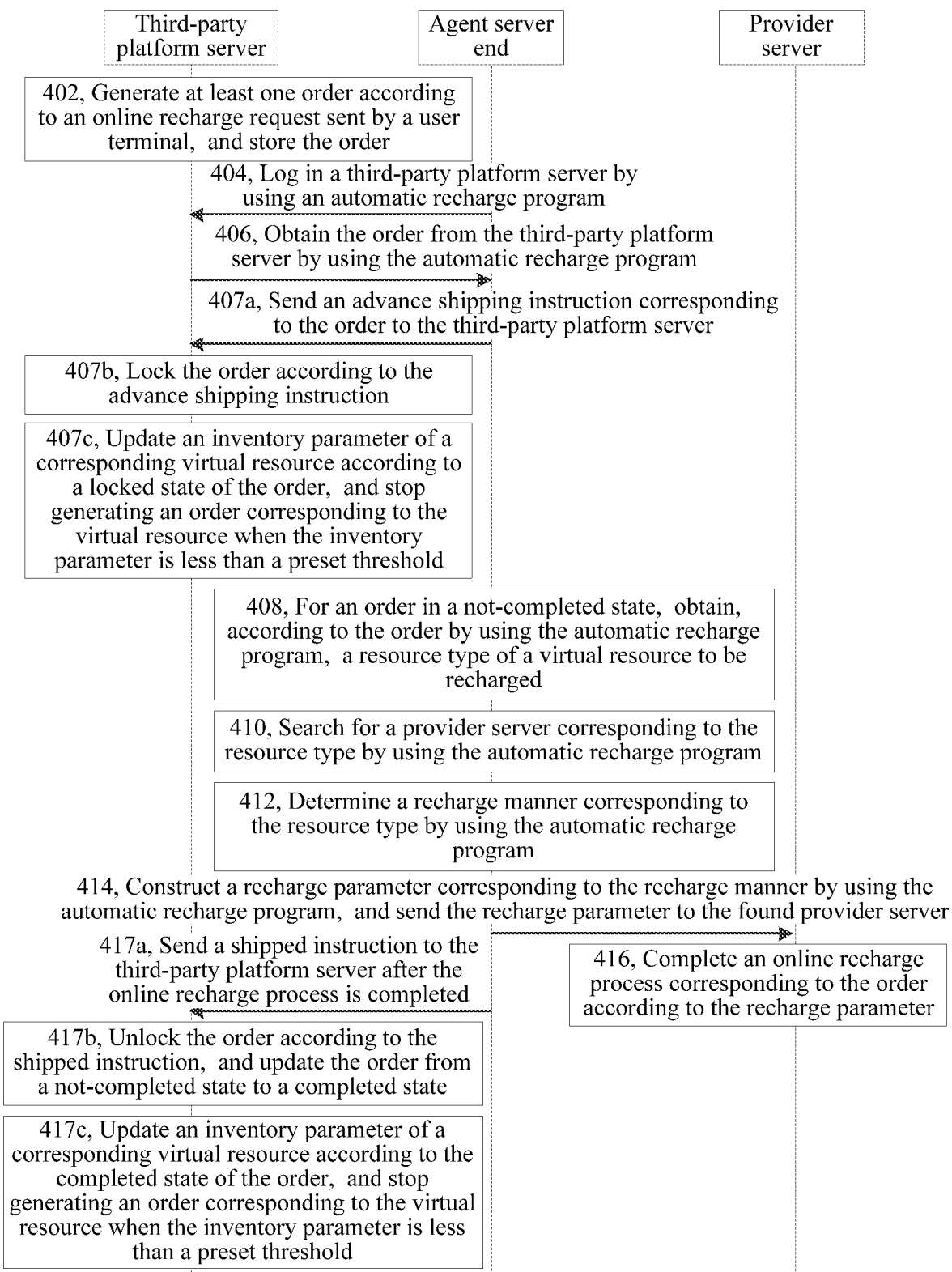
FIG. 8 is a method flowchart of an automatic recharge method according to another embodiment of the present disclosure.

In a further possible embodiment, with continuous proceeding of a recharge process, an inventory amount of a virtual resource may change, or the virtual resource may be suspended. In order to prevent a case in which the inventory amount of the virtual resource is insufficient or the virtual resource may be suspended, an online recharge process of the virtual resource is still performed. The automatic recharge method provided in this embodiment of the present disclosure further includes step 407c and step 417c, and a detailed process is shown in FIG. 8:

Step 407c: The third-party platform server updates an inventory parameter of a corresponding virtual resource according to a locked state of the order, and stops generating an order corresponding to the virtual resource when the inventory parameter is less than or equal to a preset threshold.

The third-party platform server may obtain an inventory amount of each virtual resource from the provider server, and locks a corresponding inventory of the virtual resource according to the locked state of a local order, that is, pre-deduction.

If a not-locked inventory parameter is less than or equal to the preset threshold, for example, the inventory parameter is equal to 0, the third-party platform server may stop generating an order (e.g., stop accepting a new order) corresponding to the virtual resource and send corresponding prompt information to a user terminal. The prompt information may be presented to the user terminal to indicate insufficient stock.

Step 417c: The third-party platform server updates an inventory parameter of a corresponding virtual resource according to the completed state of the order, and stops generating an order corresponding to the virtual resource when the inventory parameter is less than or equal to a preset threshold.

The third-party platform server may further deduce a corresponding inventory of the virtual resource according to the completed state of the local order.

If the deduced inventory parameter is less than or equal to the preset threshold, for example, the inventory parameter is equal to 0, the third-party platform server may stop generating an order corresponding to the virtual resource and send corresponding prompt information to the user terminal.

In conclusion, in this embodiment, the third-party platform server dynamically maintains an inventory of a virtual resource, thereby avoiding a problem that online recharge cannot be completed because the inventory is insufficient after an order is ordered, improving a successful processing rate of orders, and reducing occurrence of an incorrect order.

The following is an apparatus embodiment of the present disclosure. For details that are not described in details in the apparatus embodiment, refer to the foregoing corresponding method embodiment.

Figure 9:
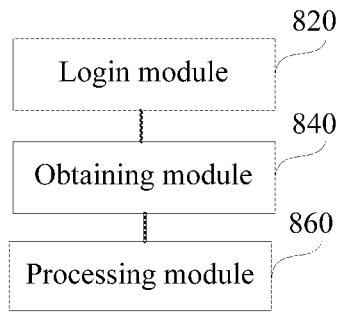
FIG. 9 is a schematic structural diagram of an agent server end according to an embodiment of the present disclosure.

Referring to FIG. 9, FIG. 9 is a schematic structural diagram of an agent server end according to an embodiment of the present disclosure. The agent server end may also be referred to as an automatic recharge apparatus, and an automatic recharge program runs on the agent server end. The server end includes: a login module 820, configured to log in a third-party platform server by using the automatic recharge program; an obtaining module 840, configured to obtain an order from the third-party platform server by using the automatic recharge program, where the order is generated by the third-party platform server according to an online recharge request sent by a user terminal; and a processing module 860, configured to: for an order at an incomplete state, send a recharge parameter corresponding to the order to a provider server by using the automatic recharge program, so that the provider server completes an online recharge process corresponding to the order according to the recharge parameter.

In conclusion, after receiving an order sent by a third-party platform server, an agent server end provided in this embodiment interacts with a provider server by using an automatic recharge program, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

Figure 10:
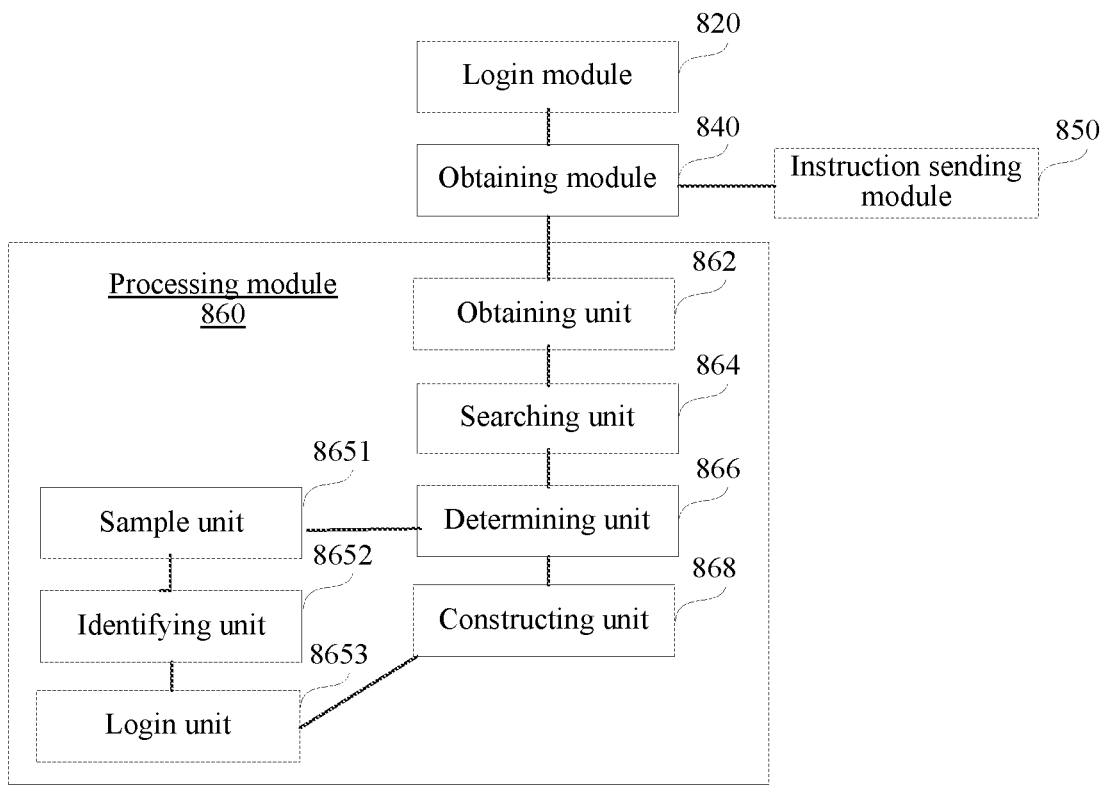
FIG. 10 is a schematic structural diagram of an agent server end according to another embodiment of the present disclosure.

Referring to FIG. 10, FIG. 10 is a schematic structural diagram of an agent server end according to another embodiment of the present disclosure. The agent server end may also be referred to as an automatic recharge apparatus, and an automatic recharge program runs on the agent server end. The server end includes: a login module 820, configured to log in a third-party platform server by using the automatic recharge program; an obtaining module 840, configured to obtain an order from the third-party platform server by using the automatic recharge program, where the order is generated by the third-party platform server according to an online recharge request sent by a user terminal; and a processing module 860, configured to: for an order at an incomplete state, send a recharge parameter corresponding to the order to a provider server by using the automatic recharge program, so that the provider server completes an online recharge process corresponding to the order according to the recharge parameter.

Optionally, the processing module 860 includes: an obtaining unit 862, configured to obtain, according to the order by using the automatic recharge program, a resource type of a virtual resource to be recharged; a searching unit 864, configured to search for/select a provider server corresponding to the resource type by using the automatic recharge program; a determining unit 866, configured to determine a recharge mode corresponding to the resource type by using the automatic recharge program, where the recharge mode includes: a recharge mode of simulating user login by using an account number and a password, a first interface recharge mode, and a second interface recharge mode; and a constructing unit 868, configured to construct a recharge parameter corresponding to the recharge mode by using the automatic recharge program, and send the recharge parameter to the found provider server.

Optionally, the server end further includes: a sample unit 8651, configured to: obtain a verification code sample library corresponding to the provider server by using the automatic recharge program if the recharge mode is the recharge mode of simulating user login by using an account number and a password; an identifying unit 8652, configured to dynamically identify a verification code of this login according to the verification code sample library; and a login unit 8653, configured to log in the agent server end by using the account number, the password, and the verification code.

Optionally, the server end further includes: an instruction sending module 850, configured to send an advance shipping instruction corresponding to the order to the third-party platform server, so that the third-party platform server locks the order according to the advance shipping instruction. the instruction sending module 850 being further configured to send a shipped instruction to the third-party platform server after the online recharge is completed, so that the third-party platform server unlocks the order according to the shipped instruction, and updates the order from the incomplete state to a completed state.

In conclusion, after receiving an order sent by a third-party platform server, an agent server end provided in this embodiment interacts with a provider server by using an automatic recharge program, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

This embodiment can further implement automatic user login simulation by dynamically identifying a verification code of this login by using a verification code sample library corresponding to each provider server, thereby avoiding problems of complex operations and low efficiency that are caused by user manual login, and achieving an effect that the automatic recharge program may implement unattended operation and automatic running.

By locking the order, this embodiment prevents a case in which multiple automatic recharge programs synchronously process a same order and a conflict occurs, and achieves higher availability.

Figure 11:
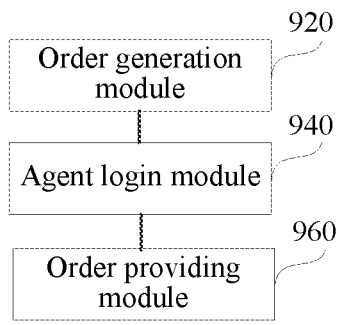
FIG. 11 is a schematic structural diagram of a third-party platform server according to an embodiment of the present disclosure.

Referring to FIG. 11, FIG. 11 is a schematic block diagram of a third-party platform server according to an embodiment of the present disclosure. The third-party platform server is also referred to as an automatic recharge apparatus. The third-party platform server includes: an order generation module 920, configured to generate at least one order according to an online recharge request sent by a user terminal, and store the order; an agent login module 940, configured to receive login of an agent server end, where an automatic recharge program runs on the agent server end; and an order providing module 960, configured to provide the order to the agent server end, so that the agent server end sends a recharge parameter corresponding to the order to a provider server by using an automatic recharge program, and the provider server completes an online recharge process corresponding to the order according to the recharge parameter.

In conclusion, a third-party platform server provided in this embodiment may uniformly manage an order, and after obtaining the order, an agent server end interacts with a provider server by using an automatic recharge program, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

Figure 12:
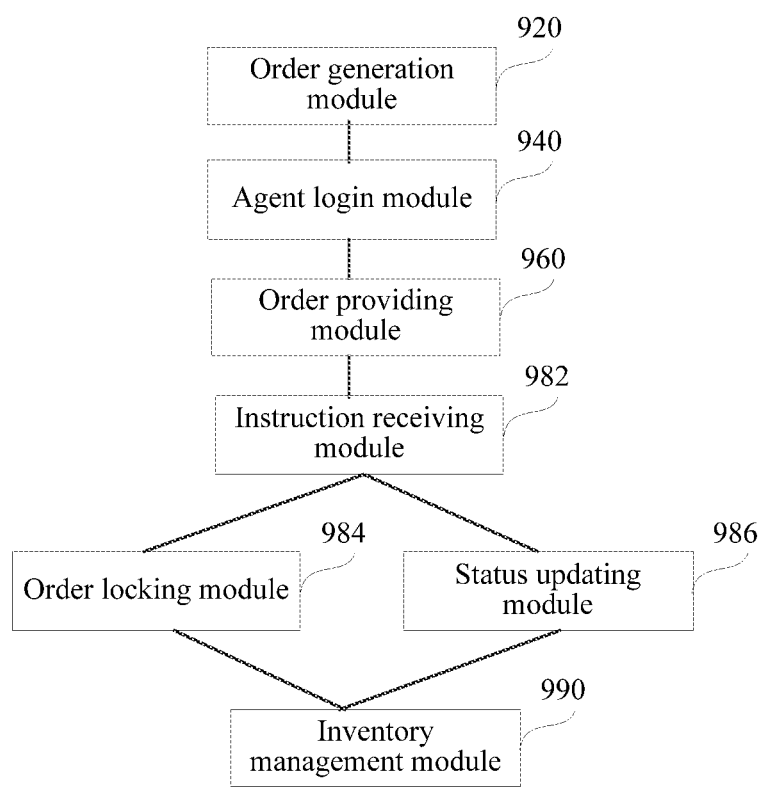
FIG. 12 is a schematic structural diagram of a third-party platform server according to another embodiment of the present disclosure.

Referring to FIG. 12, FIG. 12 is a schematic block diagram of a third-party platform server according to an embodiment of the present disclosure. The third-party platform server is also referred to as an automatic recharge apparatus. The third-party platform server includes: an order generation module 920, configured to generate at least one order according to an online recharge request sent by a user terminal, and store the order; an agent login module 940, configured to receive login of an agent server end, where an automatic recharge program runs on the agent server end; and an order providing module 960, configured to provide the order to the agent server end, so that the agent server end sends a recharge parameter corresponding to the order to a provider server by using an automatic recharge program, and the provider server completes an online recharge process corresponding to the order according to the recharge parameter.

Optionally, the server further includes: an instruction receiving module 982, configured to receive an advance shipping instruction that is sent by the agent server end and that corresponds to the order; an order locking module 984, configured to lock the order according to the advance shipping instruction; the instruction receiving module 982, further configured to receive a shipped instruction sent by the agent server end; and a status updating module 986, configured to unlock the order according to the shipped instruction and update the order from the incomplete state to a completed state.

Optionally, the server further includes: an inventory management module 990, configured to update an inventory parameter of a corresponding virtual resource according to a locked state or the completed state of the order, and stop generating an order corresponding to the virtual resource when the inventory parameter is less than or equal to a preset threshold.

In conclusion, a third-party platform server provided in this embodiment may uniformly manage an order, and after obtaining the order, an agent server end interacts with a provider server by using an automatic recharge program, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

This embodiment can further implement automatic user login simulation by dynamically identifying a verification code of this login by using a verification code sample library corresponding to each provider server, thereby avoiding problems of complex operations and low efficiency that are caused by user manual login, and achieving an effect that the automatic recharge program may implement unattended operation and automatic running.

In this embodiment, the third-party platform server dynamically maintains an inventory of a virtual resource, thereby avoiding a problem that online recharge cannot be completed because the inventory is insufficient after an order is ordered, improving a successful processing rate of orders, and reducing occurrence of an incorrect order.

Figure 13:
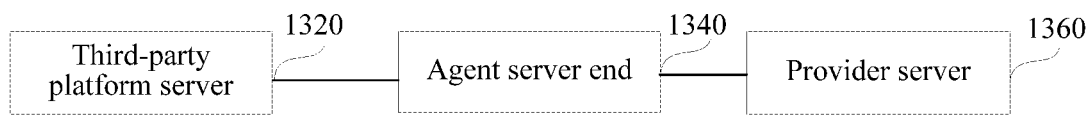
FIG. 13 is a schematic structural diagram of an automatic recharge system according to another embodiment of the present disclosure.

Referring to FIG. 13, FIG. 13 is a schematic structural diagram of an automatic recharge system according to an embodiment of the present disclosure. The system includes an agent server end 1320 on which an automatic recharge program runs, a third-party platform server 1340, and at least one provider server 1360, each provider server 1360 providing at least one online recharge service.

The third-party platform server 1340 is configured to generate at least one order according to an online recharge request sent by a user terminal, and store the order.

The agent server end 1320 is configured to log in the third-party platform server 1340 by using the automatic recharge program, and obtain the order from the third-party platform server 1340 by using the automatic recharge program.

The agent server end 1320 is configured to: for an order at an incomplete state, send a recharge parameter corresponding to the order to the provider server 1360 by using the automatic recharge program.

The provider server 1360 is configured to complete an online recharge process corresponding to the order according to the recharge parameter.

Optionally, when sending the recharge parameter corresponding to the order to the provider server 1360 by using the automatic recharge program, the agent server end 1320 is specifically configured to: obtain, according to the order by using the automatic recharge program, a resource type of a virtual resource to be recharged; search for the provider server 1360 corresponding to the resource type by using the automatic recharge program; determine a recharge mode corresponding to the resource type by using the automatic recharge program, where the recharge mode includes: a recharge mode of simulating user login by using an account number and a password, a first interface recharge mode, and a second interface recharge mode; and construct a recharge parameter corresponding to the recharge mode by using the automatic recharge program, and send the recharge parameter to the found provider server 1360.

Optionally, before constructing the recharge parameter corresponding to the recharge mode, the agent server end 1320 is further configured to: if the recharge mode is the recharge mode of simulating user login by using an account number and a password, obtain, by the agent server end 1320, a verification code sample library corresponding to the provider server 1360 by using the automatic recharge program, dynamically identify a verification code of this login according to the verification code sample library, and login the agent server end according to the account number, the password, and the verification code.

Optionally, the agent server end 1320 is further configured to: before sending the recharge parameter corresponding to the order to the provider server 1360, send an advance shipping instruction corresponding to the order to the third-party platform server 1340.

The third-party platform server 1340 is further configured to lock the order according to the advance shipping instruction.

The agent server end 1320 is further configured to send a shipped instruction to the third-party platform server 1340 after the online recharge process is completed.

The third-party platform server 1340 is further configured to unlock the order according to the shipped instruction, and update the order from the incomplete state to a completed state.

Optionally, the third-party platform server 1340 is further configured to update an inventory parameter of a corresponding virtual resource according to a locked state or the completed state of the order, and stop generating an order corresponding to the virtual resource when the inventory parameter is less than or equal to a preset threshold.

In conclusion, in an automatic recharge system provided in this embodiment, an order is uniformly managed by using a third-party platform server, and an automatic recharge program running in an agent server end automatically interacts with a provider server, so as to complete an online recharge process corresponding to the order, thereby overcoming a defect that an agent needs to learn and master multiple online recharge modes, resolving a problem of low recharging efficiency and a relatively high error rate that are caused by manually completing the online recharge process, achieving an aim of implementing automatic online recharge by only installing and running the automatic recharge program in the agent server end by the agent, reducing learning cost and an error rate, and improving an online recharge effect.

This embodiment can further implement automatic user login simulation by dynamically identifying a verification code of this login by using a verification code sample library corresponding to each provider server, thereby avoiding problems of complex operations and low efficiency that are caused by user manual login, and achieving an effect that the automatic recharge program may implement unattended operation and automatic running.

In this embodiment, the third-party platform server dynamically maintains an inventory of a virtual resource, thereby avoiding a problem that online recharge cannot be completed because the inventory is insufficient after an order is ordered, improving a successful processing rate of orders, and reducing occurrence of an incorrect order.

Figure 14:
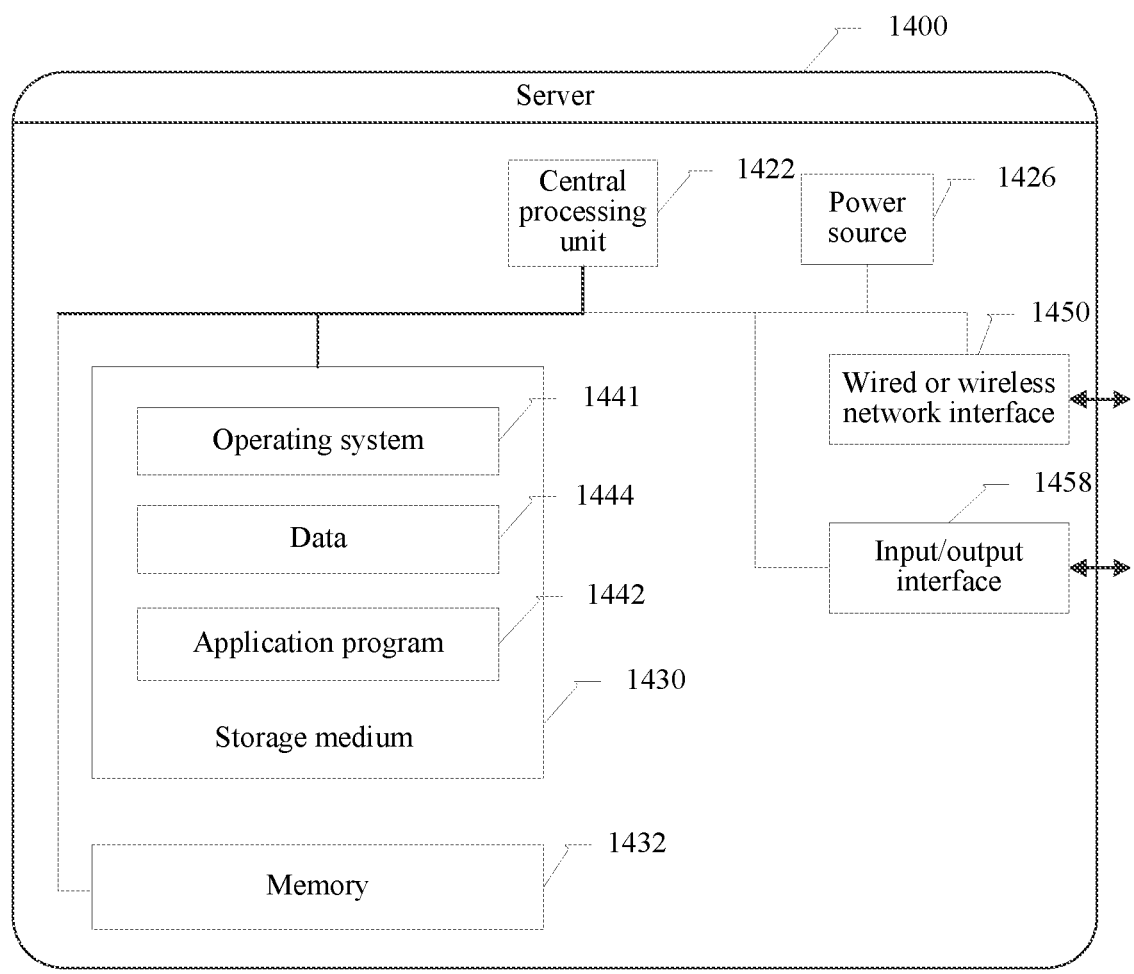
FIG. 14 is a schematic structural diagram of an agent server end according to another embodiment of the present disclosure.

FIG. 14 shows a server provided in this embodiment of the present disclosure. The server may be configured to perform an automatic recharge method performed by an agent server end in the embodiments shown in FIG. 3 to FIG. 5, FIG. 7, and FIG. 8. Referring to FIG. 14, the server 1400 may have a relatively great difference because of a different configuration or performance, and may include one or more central processing units (CPU) 1422 (such as one or more processors) and a memory 1432, one or more storage application programs 1442 or storage media 1430 (such as one or more massive storage devices) of data 1444. The memory 1432 and the storage medium 1430 may be used for temporary storage or long-lasting storage. A program stored in the storage medium 1430 may include one or more modules (not marked in the drawing), and each module may include a series of instruction operations in the server. Further, the central processing unit 1422 may be set to communicate with the storage medium 1430, and perform a series of instruction operations in the storage medium 1430 on the server 1400.

The server 1400 may further include one or more power sources 1426, one or more wired or wireless network interfaces 1450, one or more input/output interfaces 1458, and/or one or more operating systems 1441, such as Windows Server™, Mac OS X™, Unix™, Linux™, and FreeBSD™. One or more processors may be configured to perform operations performed by the agent server end in the foregoing method embodiments.

In an exemplary embodiment, a non-temporary computer-readable storage medium including an instruction, such as a memory including an instruction, is provided. The instruction may be performed by a processor of a server, so as to complete an automatic recharge method performed by the agent server end in the embodiments shown in FIG. 3 to FIG. 5, FIG. 7, and FIG. 8. For example, the non-temporary computer-readable storage medium may be an ROM, a random access memory (RAM), a CD-ROM, a magnetic tape, a floppy disk, and an optical data storage device.

Figure 15:
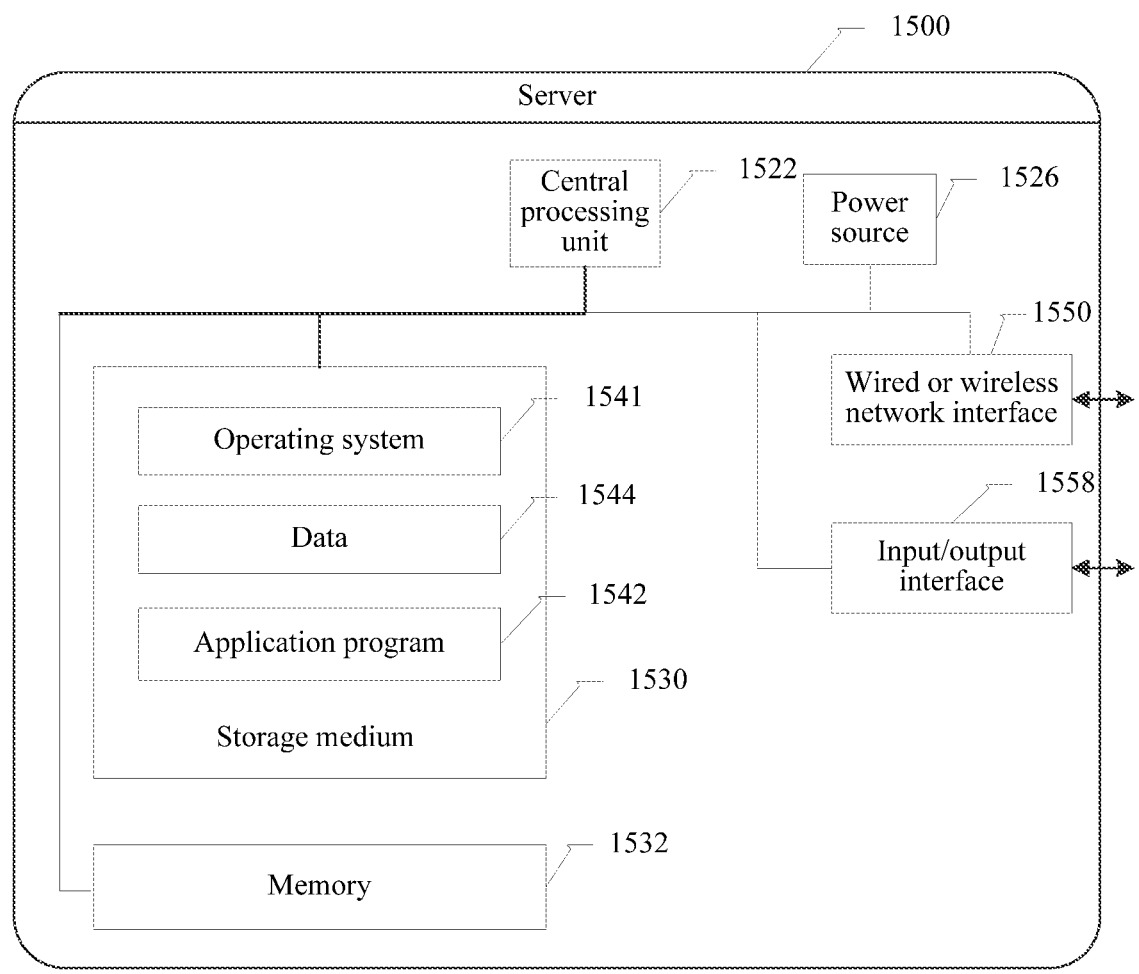
FIG. 15 is a schematic structural diagram of a third-party platform server according to another embodiment of the present disclosure.

FIG. 15 shows a server provided in this embodiment of the present disclosure. The server may be configured to perform an automatic recharge method performed by a third-party platform server in the embodiments shown in FIG. 3 to FIG. 5, FIG. 7, and FIG. 8. Referring to FIG. 15, the server 1500 may have a relatively great difference because of a different configuration or performance, and may include one or more central processing units (CPU) 1522 (such as one or more processors) and a memory 1532, one or more storage application programs 1542 or storage media 1530 (such as one or more massive storage devices) of data 1544. The memory 1532 and the storage medium 1530 may be used for temporary storage or long-lasting storage. A program stored in the storage medium 1530 may include one or more modules (not marked in the drawing), and each module may include a series of instruction operations in the server. Further, the central processing unit 1522 may be set to communicate with the storage medium 1530, and perform a series of instruction operations in the storage medium 1530 on the server 1500.

The server 1500 may further include one or more power sources 1526, one or more wired or wireless network interfaces 1550, one or more input/output interfaces 1558, and/or one or more operating systems 1541, such as Windows Server™, Mac OS X™, Unix™, Linux™, and FreeBSD™. One or more processors may be configured to perform operations performed by the server in the foregoing method embodiments.

In an exemplary embodiment, a non-temporary computer-readable storage medium including an instruction, such as a memory including an instruction, is provided. The instruction may be performed by a processor of a server, so as to complete an automatic recharge method performed by the third-party platform server in the embodiments shown in FIG. 3 to FIG. 5, FIG. 7, and FIG. 8. For example, the non-temporary computer-readable storage medium may be an ROM, a random access memory (RAM), a CD-ROM, a magnetic tape, a floppy disk, and an optical data storage device.

It should be noted that the above functional modules are only described for exemplary purposes when the automatic recharge system provided by the foregoing embodiments completes an online recharge process. In actual applications, the functions may be allocated to different functional modules according to specific needs, which means that the internal structure of the apparatus is divided to different functional modules to complete all or some of the above described functions. In addition, the automatic recharge system provided by the foregoing embodiments is based on the same concept as the automatic recharge method in the method embodiments. For the specific implementation process, refer to the method embodiments, and the details are not described herein again.

The sequence numbers of the foregoing embodiments of the present disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An automatic recharge system, comprising: an agent server end configured to run an automatic recharge program, a third-party platform server, and at least one provider server, each provider server providing at least one online recharge service;
   the third-party platform server being configured to connect a user terminal and the agent server end; receive an online recharge request from the user terminal; and generate an order for the agent server end according to the online recharge request, the order including a status indicating whether the order is of an incomplete state, and if the order is of the incomplete state, the third-party platform is further configured to lock the order to be of a locked state to avoid redundant processing by more than one agent server;
   the agent server end being configured to log in the third-party platform server by using the automatic recharge program, and obtain the order from the third-party platform server by using the automatic recharge program, wherein the automatic recharge program is an application program provided by a software service provider and is configured to automatically complete the at least one online recharge service;
   the agent server end being configured to connect the third-party platform server and the at least one provider server;
   the agent server end being further configured to: if the order is of the incomplete state, send a recharge parameter corresponding to the order to the at least one provider server associated with the recharge parameter by using the automatic recharge program;
   the provider server being configured to receive the recharge parameter sent by the agent server end, and complete an online recharge process corresponding to the order according to the recharge parameter, such that the at least one online recharge service of a virtual currency is improved.

2. The system according to claim 1, wherein when sending the recharge parameter corresponding to the order to the provider server by using the automatic recharge program, the agent server end is further configured to:

obtain, according to the order by using the automatic recharge program, a resource type of a virtual resource to be recharged;

search for the provider server corresponding to the resource type by using the automatic recharge program;

determine a recharge mode corresponding to the resource type by using the automatic recharge program, wherein the recharge mode comprises: a recharge mode of simulating user login by using an account number and a password, a first interface recharge mode, and a second interface recharge mode; and construct the recharge parameter corresponding to the recharge mode by using the automatic recharge program, and send the recharge parameter to the found provider server.

3. The system according to claim 2, wherein before constructing the recharge parameter corresponding to the recharge mode, the agent server end is further configured to:

obtain, by the agent server end, a verification code sample library corresponding to the provider server by using the automatic recharge program if the recharge mode of simulating user login by using the account number and the password is used, dynamically identify a verification code of a current login according to the verification code sample library, and log in the provider server by using the account number, the password, and the verification code.

4. The system according to claim 1, wherein:

the agent server end is further configured to: before sending the recharge parameter corresponding to the order to the provider server, send an advance shipping instruction corresponding to the order to the third-party platform server;

the third-party platform server is further configured to lock the order according to the advance shipping instruction;

the agent server end is further configured to send a shipped instruction to the third-party platform server after the online recharge process corresponding to the order is completed; and the third-party platform server is further configured to unlock the order according to the shipped instruction, and update the order from the incomplete state to a completed state.

5. The system according to claim 4, wherein the third-party platform server is further configured to:

update an inventory parameter of a corresponding virtual resource according to the locked state or the completed state of the order, and stop generating an order corresponding to the virtual resource when the inventory parameter is less than or equal to a preset threshold.

6. An automatic recharge method, applied to an agent server end, comprising:

logging in a third-party platform server by using an automatic recharge program on the agent server, wherein the automatic recharge program is an application program provided by a software service provider and is configured to automatically complete an online recharge service;

obtaining an order from the third-party platform server by using the automatic recharge program, wherein the third-party platform server is configured to connect a user terminal and the agent server end, receive an online recharge request from the user terminal, and generate the order for the agent server end according to the online recharge request, and wherein the order includes a status indicating whether the order is of an incomplete state, and if the order is of the incomplete state, the third-party platform is further configured to lock the order to be of a locked state to avoid redundant processing by more than one agent server;

connecting the third-party platform server and at least one provider server; and if the order is of the incomplete state, sending a recharge parameter corresponding to the order to the at least one provider server by using the automatic recharge program, wherein the provider server receives the recharge parameter and completes an online recharge process corresponding to the order according to the recharge parameter, such that the online recharge service of a virtual currency is improved.

7. The method according to claim 6, wherein the sending a recharge parameter corresponding to the order to the provider server by using the automatic recharge program comprises:

obtaining, according to the order by using the automatic recharge program, a resource type of a virtual resource to be recharged;

searching for the provider server corresponding to the resource type by using the automatic recharge program;

determining a recharge mode corresponding to the resource type by using the automatic recharge program, wherein the recharge mode comprises: a recharge mode of simulating user login by using an account number and a password, a first interface recharge mode, and a second interface recharge mode; and constructing the recharge parameter corresponding to the recharge mode by using the automatic recharge program, and sending the recharge parameter to the found provider server.

8. The method according to claim 7, before the constructing a recharge parameter corresponding to the recharge mode by using the automatic recharge program, further comprising:

if the recharge mode of simulating user login by using an account number and a password is used, obtaining a verification code sample library corresponding to the provider server by using the automatic recharge program;

dynamically identifying a verification code of a current login according to the verification code sample library; and logging in the provider server by using the account number, the password, and the verification code.

9. The method according to claim 6, before the sending a recharge parameter corresponding to the order to the provider server, further comprising:

sending an advance shipping instruction corresponding to the order to the third-party platform server, wherein the third-party platform server locks the order according to the advance shipping instruction; and sending a shipped instruction to the third-party platform server after the online recharge process corresponding to the order is completed, wherein the third-party platform server unlocks the order according to the shipped instruction, and updates the order from the incomplete state to a completed state.

10. The method according to claim 6, further comprising:

generating, by the third-party platform server, at least one order according to the online recharge request sent by the user terminal, and storing the order; and after the agent server end logs in the third-party platform server, providing, by the third-party platform server, the order to the agent server end.

11. The method according to claim 10, after the providing the order to the agent server end, further comprising:
receiving, by the third-party platform server, an advance shipping instruction that is sent by the agent server end and that corresponds to the order;
locking, by the third-party platform server, the order according to the advance shipping instruction;
receiving, by the third-party platform server, a shipped instruction sent by the agent server end; and
unlocking, by the third-party platform server, the order according to the shipped instruction and updating the order from the incomplete state to a completed state.

12. The method according to claim 11, further comprising:
updating, by the third-party platform server, an inventory parameter of a corresponding virtual resource according to the locked state or the completed state of the order, and
stopping generating, by the third-party platform server, an order corresponding to the virtual resource when the inventory parameter is less than or equal to a preset threshold.

13. A server, comprising: a central processing unit and a memory, the memory storing a group of program codes, and the central processing unit executing the program codes stored in the memory to complete the following operations:
logging in a third-party platform server by using an automatic recharge program, wherein the automatic recharge program is an application program provided by a software service provider and is configured to automatically complete an online recharge service;
obtaining an order from the third-party platform server by using the automatic recharge program, wherein the third-party platform server is configured to connect a user terminal and an agent server end, receive an online recharge request from the user terminal, and generate the order for the agent server end according to the online recharge request, and wherein the order includes a status indicating whether the order is of an incomplete state, and if the order is of the incomplete state, the third-party platform is further configured to lock the order to be of a locked state to avoid redundant processing by more than one agent server;
connecting the third-party platform server and a provider server; and
if the order is of the incomplete state, sending a recharge parameter corresponding to the order to the provider server by using the automatic recharge program, wherein the provider server receives the recharge parameter and completes an online recharge process corresponding to the order according to the recharge parameter, such that the online recharge service of a virtual currency is improved.

14. The server according to claim 13, wherein the central processing unit executes the program codes stored in the memory to complete the following operations:
obtaining, according to the order by using the automatic recharge program, a resource type of a virtual resource to be recharged;
searching for the provider server corresponding to the resource type by using the automatic recharge program;
determining a recharge mode corresponding to the resource type by using the automatic recharge program, wherein the recharge mode comprises: a recharge mode of simulating user login by using an account number and a password, a first interface recharge mode, and a second interface recharge mode; and
constructing the recharge parameter corresponding to the recharge mode by using the automatic recharge program, and sending the recharge parameter to the found provider server.

15. The server according to claim 14, wherein the central processing unit executes the program codes stored in the memory to complete the following operations:
obtaining a verification code sample library corresponding to the provider server by using the automatic recharge program if the recharge mode of simulating user login by using an account number and a password is used;
dynamically identifying a verification code of this login according to the verification code sample library; and
logging in the provider server by using the account number, the password, and the verification code.

16. The server according to claim 13, wherein the central processing unit executes the program codes stored in the memory to complete the following operations:
sending an advance shipping instruction corresponding to the order to the third-party platform server, wherein the third-party platform server locks the order according to the advance shipping instruction; and
sending a shipped instruction to the third-party platform server after the online recharge process corresponding to the order is completed, wherein the third-party platform server unlocks the order according to the shipped instruction, and updates the order from the incomplete state to a completed state.

17. A server, comprising: a central processing unit and a memory, the memory storing a group of program codes, and the central processing unit executing the program codes stored in the memory to complete the following operations:
generating at least one order according to an online recharge request sent by a user terminal, and storing the order, wherein the server is configured to connect the user terminal and an agent server end, receive the online recharge request from the user terminal, and generate the at least one order, and wherein the at least one order includes a status indicating whether the at least one order is of an incomplete state, and if the at least one order is of the incomplete state, the third-party platform is further configured to lock the at least one order to be of a locked state to avoid redundant processing by more than one agent server;
connecting the third-party platform server and a provider server; and
after the agent server end logs in the server, providing the at least one order to the agent server end, so that the agent server end sends a recharge parameter corresponding to the at least one order to the provider server by using an automatic recharge program, and the provider server receives the recharge parameter and completes an online recharge process corresponding to the order according to the recharge parameter, the automatic recharge program running on the agent server end, such that an online recharge service of a virtual currency is improved.

18. The server according to claim 17, wherein the central processing unit executes the program codes stored in the memory to complete the following operations:
receiving an advance shipping instruction that is sent by the agent server end and that corresponds to the order;

locking the order according to the advance shipping instruction;

receiving a shipped instruction sent by the agent server end; and unlocking the order according to the shipped instruction and updating the order from the not-completed state to a completed state.

19. The server according to claim 18, wherein the central processing unit executes the program codes stored in the memory to complete the following operations:

updating an inventory parameter of a corresponding virtual resource according to the locked state or the completed state of the order, and stopping generating an order corresponding to the virtual resource when the inventory parameter is less than or equal to a preset threshold.

20. The automatic recharge system according to claim 1, wherein the agent server end, by using the automatic recharge program, is configured to log in the third-party platform server, obtain the order from the third-party platform server, obtain a resource type of a virtual resource to be recharged, search for the provider server corresponding to the resource type, determine a recharge mode corresponding to the resource type, and construct the recharge parameter corresponding to the recharge mode.

* * * * *